(12) United States Patent
Xing et al.

(10) Patent No.: US 11,370,003 B2
(45) Date of Patent: Jun. 28, 2022

(54) CLEANING DEVICE AND CONTROL METHOD THEREFOR

(71) Applicant: BEIJING XIAOMI MOBILE SOFTWARE CO., LTD., Beijing (CN)

(72) Inventors: Zheng Xing, Beijing (CN); Yingchun Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 286 days.

(21) Appl. No.: 16/882,476

(22) Filed: May 23, 2020

(65) Prior Publication Data

US 2021/0205864 A1 Jul. 8, 2021

(30) Foreign Application Priority Data

Jan. 7, 2020 (CN) .......................... 202010014871.4

(51) Int. Cl.
*B08B 13/00* (2006.01)
*A47K 5/12* (2006.01)
*A47L 17/00* (2006.01)
*B08B 1/00* (2006.01)
*B08B 3/08* (2006.01)
*G05D 7/06* (2006.01)

(52) U.S. Cl.
CPC ............ *B08B 13/00* (2013.01); *A47K 5/1201* (2013.01); *A47L 17/00* (2013.01); *B08B 1/001* (2013.01); *B08B 3/08* (2013.01); *G05D 7/0617* (2013.01)

(58) Field of Classification Search
None
See application file for complete search history.

(56) References Cited

U.S. PATENT DOCUMENTS

| 2011/0052306 A1* | 3/2011 | Cavaiani | A46B 11/0079 |
| | | | 222/105 |
| 2015/0227705 A1* | 8/2015 | Zaima | B65D 83/386 |
| | | | 222/39 |

* cited by examiner

*Primary Examiner* — Eric W Golightly
(74) *Attorney, Agent, or Firm* — Syncoda LLC; Feng Ma

(57) ABSTRACT

A cleaning device includes a main body housing, a cleaning liquid tank, a pressure sensor and a flow controller. By arranging one or more pressure sensors on a gripping portion of the main body housing and movably fitting flow limiters of the flow controller with liquid outlets of the cleaning liquid tank, a control component of the flow controller drives the flow limiters according to a pressure signal transmitted by the one or more pressure sensors, such that a flow limiting area of the flow limiters fitted with the liquid outlets is changed. As such, when gripping the cleaning device, a user can control an outflow of cleaning liquid by a pressure applied to the one or more pressure sensors by hand during gripping, such that the liquid outflow meets use requirement for each single squeeze.

18 Claims, 8 Drawing Sheets

CLEANING DEVICE AND CONTROL METHOD THEREFOR

CROSS-REFERENCE TO RELATED APPLICATION

The present application claims priority to Chinese Patent Application No. 202010014871.4 filed on Jan. 7, 2020, the disclosure of which is hereby incorporated by reference in its entirety.

BACKGROUND

Users often need to use solid soap, shower gel, hand sanitizer or the like when bathing or washing hands, and also need to use solid or liquid cleansers such as dish detergent when cleaning kitchens and rooms. The solid soap is less hygienic and inconvenient to store; while the liquid hand sanitizer, shower gel, dish detergent or the like will need to be squeezed out of its container.

SUMMARY

The present disclosure relates to the field of smart homes, and more specifically to a cleaning device and a control method therefor.

Various embodiments of the present disclosure can provide a cleaning device and a control method to improve user convenience when using the cleaning liquid.

In accordance with a first aspect of the present disclosure, a cleaning device is provided, including:

a main body housing, an inner surface of the main body housing forming an accommodating space, a gripping portion being arranged on an outer surface of the main body housing, and one or more through holes communicating the accommodating space with the outside being arranged on the main body housing;

a cleaning liquid tank, accommodated within the accommodating space, one or more liquid outlets being formed on the cleaning liquid tank and fitted with the one or more through holes;

one or more pressure sensors, arranged on the gripping portion; and a flow controller, including a control component and flow limiters, the flow limiters being movably fitted with one or more the liquid outlets, the control component being electrically connected to the one or more pressure sensors to drive the flow limiters and change flow limiting area of the flow limiters fitted with the liquid outlet, according to a pressure signal transmitted by the one or more pressure sensors.

In some embodiments, one or more elastic covers is arranged outside the one or more pressure sensors.

In some embodiments, the cleaning device includes multiple pressure sensors which are arranged in different regions of the gripping portion.

In some embodiments, the gripping portion includes a first gripping region and a second gripping region; the outer surface of the main body housing includes a first side face and a second side face opposite to each other; and, one of the first gripping region and the second gripping region is arranged on the first side face, and the other one is arranged on the second side face.

In some embodiments, a liquid feeding opening is formed on the cleaning liquid tank; a matched opening and a waterproof plug are correspondingly arranged on the main body housing; and, the waterproof plug is in detachable seal fit with the liquid feeding opening and the matched opening.

In some embodiments, multiple through holes are formed on the main body housing, and the multiple through holes are uniformly distributed on any sidewall of the main body housing.

In some embodiments, decontaminating bumps are further arranged on the outer surface of the main body housing, and the decontaminating bumps and the one or more through holes are arranged on different side faces of the main body housing.

In some embodiments, the cleaning device further includes a wireless communication component; a liquid metering sensor is arranged in the cleaning liquid tank; and, the wireless communication component is electrically connected to the liquid metering sensor and an external device, respectively.

In some embodiments, the cleaning device can further include a charging base in which a wireless charging component is arranged, a power supply being arranged in the main body housing; and, when the main body housing is fitted with the charging base, a position of the wireless charging component corresponds to a position of the power supply.

In some embodiments, the charging base includes an accommodating groove which is matched with the main body housing in size; and, the wireless charging component is arranged on the bottom of the accommodating groove.

In accordance with a second aspect of the present disclosure, a method for controlling a cleaning device is provided, applied to the cleaning device described above, including:

acquiring a pressure signal transmitted by the one or more pressure sensors, the pressure signal being an electrical signal through which the magnitude of a pressure value sensed by the pressure sensor is indicated; and determining whether the pressure value indicated by the pressure signal is greater than a first threshold; controlling the flow limiter to completely block the liquid outlet if the pressure value indicated by the pressure signal is not greater than the first threshold; determining whether the pressure value indicated by the pressure signal is less than a second threshold if the pressure value indicated by the pressure signal is greater than the first threshold; controlling the flow limiter to move to a position where the liquid outlet is at least partially blocked when the pressure value indicated by the pressure signal is less than the second threshold; and, controlling the flow limiter to move to a position where the liquid outlet is not blocked and which is distal from the liquid outlet when the pressure value indicated by the pressure signal is greater than the second threshold.

In some embodiments, the cleaning device includes a wireless communication component and a liquid metering sensor arranged in the cleaning liquid tank, the wireless communication component being electrically connected to the liquid metering sensor and an external device, respectively; and, the method further includes steps of:

acquiring, from the liquid metering sensor, a monitored value of the amount of cleaning liquid in the cleaning liquid tank; and determining whether the monitored value is less than a preset numerical value, and transmitting prompting information to the external device by the wireless communication component if the monitored value is less than the preset numerical value.

In accordance with a third aspect of the present disclosure, a device for controlling a cleaning device is provided, applied to the cleaning device described above, including:

a processor; and memory configured to store instructions executable for the processor that, when executed by the processor, causes the processor to:

acquire a pressure signal transmitted by the one or more pressure sensors, the pressure signal being an electrical signal through which the magnitude of a pressure value sensed by the pressure sensor is indicated; and determine whether the pressure value indicated by the pressure signal is greater than a first threshold; control the flow limiter to completely block the liquid outlet if the pressure value indicated by the pressure signal is not greater than the first threshold; determine whether the pressure value indicated by the pressure signal is less than a second threshold if the pressure value indicated by the pressure signal is greater than the first threshold; control the flow limiter to move to a position where the liquid outlet is at least partially blocked when the pressure value indicated by the pressure signal is less than the second threshold; and, control the flow limiter to move to a position where the liquid outlet is not blocked and which is distal from the liquid outlet when the pressure value indicated by the pressure signal is greater than the second threshold.

In some embodiments, the cleaning device includes a wireless communication component and a liquid metering sensor arranged in the cleaning liquid tank, the wireless communication component being electrically connected to the liquid metering sensor and an external device, respectively; and, the instructions further cause the processor to:

acquire, from the liquid metering sensor, a monitored value of the amount of cleaning liquid in the cleaning liquid tank; and determine whether the monitored value is less than a preset numerical value, and send alert information to the external device through the wireless communication component if the monitored value is less than the preset numerical value.

In accordance with a fourth aspect of the present disclosure, a computer readable storage medium is provided, which stores computer instructions that, when executed by a processor, implement the operations in the method for controlling a cleaning device described above.

It should be understood that the foregoing general description and the following detailed description are merely exemplary and explanatory, and are not intended to limit the present disclosure.

BRIEF DESCRIPTION OF THE DRAWINGS

The accompanying drawings to be described herein are incorporated into this disclosure and constitute a part of this disclosure. These accompanying drawings show the embodiments of the present disclosure, and are used with this specification to explain the principle of the present disclosure.

DETAILED DESCRIPTION

Figure 1:
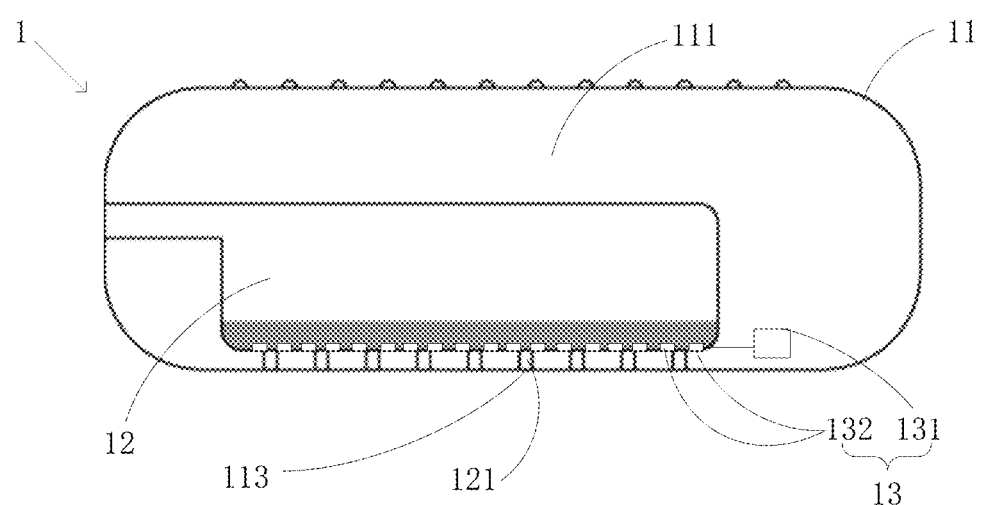
FIG. 1 is a schematic sectional view of a cleaning device according to some embodiments of the present disclosure.

Exemplary embodiments will be described in detail herein, and examples in the exemplary embodiments are shown in the accompanying drawings. When the accompanying drawings are involved in the following description, unless otherwise indicated, identical reference numerals in different accompanying drawings indicate identical or similar elements. The embodiments described in the following exemplary embodiments do not represent all embodiments consistent with the present disclosure. Instead, these embodiments are merely examples of devices and methods consistent with some aspects of the present disclosure as detailed in the appended claims.

Users may feel inconvenient when using liquid cleanser because of uncontrollable outflow from the container, and may have to squeeze the container repeatedly.

It is to be noted that, the cleaning device can be used for washing hands, bathing, washing dishes, wiping glass or the like as long as the corresponding cleaning liquid is used. In the present disclosure, the application scenario of the cleaning device is not limited. For example, when the cleaning device is used for washing hands, the cleaning liquid can be hand sanitizer, liquid soap or the like; and, when the cleaning device is used for bathing, the cleaning liquid can be liquid soap, shower gel or the like.

Figure 2:
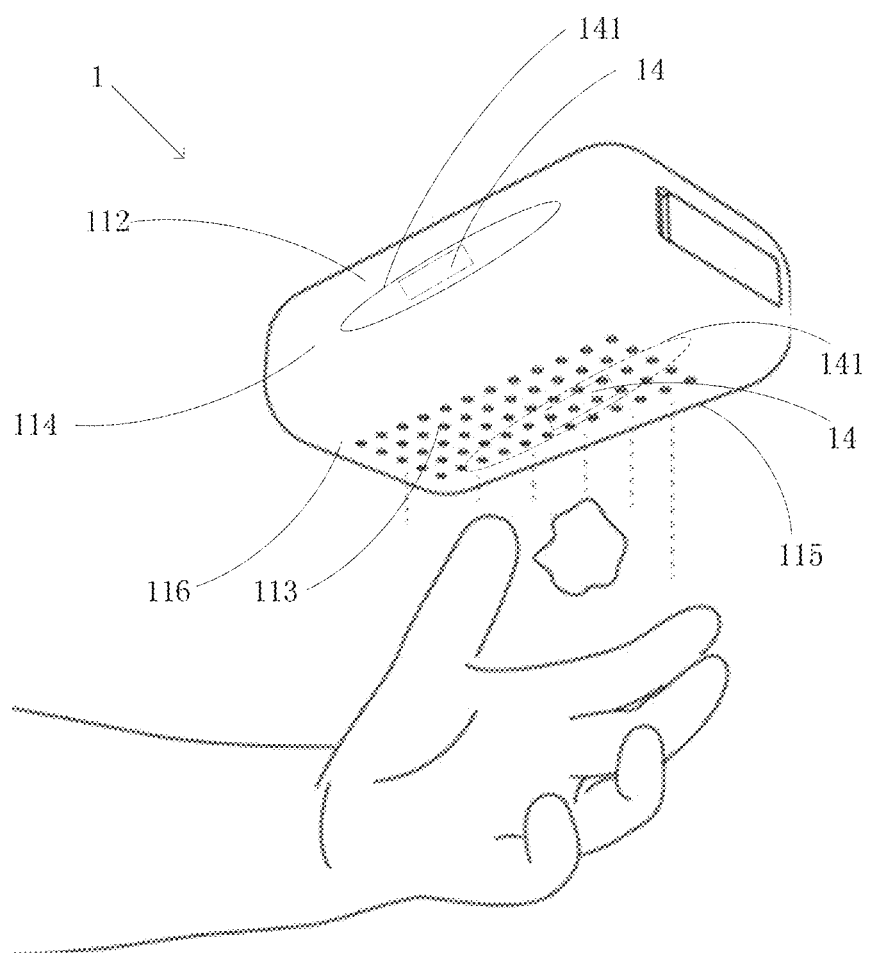
FIG. 2 is a schematic view of an application scenario of the cleaning device according to some embodiments of the present disclosure.

FIG. 1 is a schematic sectional view of a cleaning device according to some embodiments of the present disclosure, and FIG. 2 is a schematic view of an application scenario of the cleaning device according to some embodiments of the present disclosure. As shown in FIGS. 1 and 2, the cleaning device 1 includes a main body housing 11, a cleaning liquid tank 12, one or more pressure sensors 14 and a flow controller 13. An inner surface of the main body housing 11 forms an accommodating space 111, a gripping portion 112 is arranged on an outer surface of the main body housing 11, and one or more through holes 113 communicating the accommodating space 111 with the outside is formed on the main body housing 11. The cleaning liquid tank 12 is accommodated within the accommodating space 111. One or more liquid outlets 121 are formed on the cleaning liquid tank 12 and fitted with the through holes 113 on the main body housing 11. The pressure sensors 14 are assembled on the gripping portion 112. The flow controller 13 includes a control component 131 and flow limiters 132. The flow limiters 132 are movably fitted with the liquid outlets 121. The control component 131 are electrically connected to the pressure sensor 14 to drive the flow limiter 132 and change the flow limiting area of the flow limiter 132 fitted with the liquid outlet 121, according to a pressure signal transmitted by the pressure sensor 14.

By arranging the pressure sensor 14 on the gripping portion 112 of the main body housing 11 and movably fitting the flow limiter 132 of the flow controller 13 with the liquid outlet 121 of the cleaning liquid tank 12, the control component 131 of the flow controller 13 drives the flow limiter 132 according to the pressure signal transmitted by the pressure sensor 14, so that the flow limiting area of the flow limiter 132 fitted with the liquid outlet 121 is changed. The liquid outflow from the liquid outlet 121 is small when the flow limiting area of the flow limiter 132 fitted with the liquid outlet 121 is large, while the liquid outflow from the liquid outlet 121 is large when the flow limiting area of the flow limiter 132 fitted with the liquid outlet 121 is small. Therefore, with the above structural arrangement, when gripping the cleaning device 1, a user can control the outflow of cleaning liquid through the pressure applied to the pressure sensor 14 by hands during gripping, so that the liquid outflow meets the use requirement at one time. Accordingly, repeated squeezing and pouring are avoided, and the convenience and intelligence for the user in using the cleaning liquid are enhanced.

In the embodiment, the outer surface of the main body housing 11 can be formed into a shape matched with the gripping curve of the user's hand. For example, the outer surface of the main body housing 11 can be formed into a cuboid block structure, whose size is matched with the gripping of the hand in thickness direction and width direction, and two adjacent sides of which form an arc-shaped transition, so that it is convenient for gripping. Or, the outer surface of the main body housing 11 can also be formed into a spherical, ellipsoidal or irregularly stereoscopic structure, as long as the main body housing 11 has a structure convenient for gripping. In the present disclosure, the structural shape formed by the outer surface of the main body housing 11 is not limited.

As shown in FIG. 2, the gripping portion 112 is arranged on the outer surface of the main body housing 11 and used for allowing the user to grip the cleaning device 1. For example, the gripping portion 112 may include a first gripping region and a second gripping region; the outer surface of the main body housing 11 includes a first side face 114 and a second side face 115 opposite to each other; and, one of the first gripping region and the second gripping region is arranged on the first side face 114, while the other one thereof is arranged on the second side face 115. The gripping portion 112 is divided into two regions, and the two regions are arranged on two opposite side faces of the outer surfaces of the main body housing 11, so that it is convenient for the user to apply a force and grip with hands. As shown in FIG. 2, when the outer surface of the main body housing 11 is formed into a cuboid block structure, the first side face 114 and the second side face 115 can be side faces formed by long edges and short edges along the thickness direction of the cuboid block structure. In this case, the gripping regions arranged on the first side face 114 and the second side face 115 can adapt to the gripping habits of the hands, thereby improving the convenience in use.

Further, one or more through holes 113 can be formed on the main body housing 11, and the liquid outlet 121 on the cleaning liquid tank 12 is fitted with the through hole 113 in one-to-one correspondence, so that the cleaning liquid in the cleaning liquid tank 12 flows out from the through hole 113 on the main body housing 11. When multiple through holes 113 are formed on the main body housing 11, the multiple through holes 113 are uniformly distributed on any sidewall of the main body housing 11, to improve the controllability of the liquid outflow and enhance the exterior aesthetics of the cleaning device 1. As shown in FIG. 2, the outer surface of the main body housing 11 may include a third side face 116 which is formed by a long edge and a short side in the width direction of the cuboid block structure. The through holes 113 are formed on the third side face 116. Since the third side face 116 is a side face with the largest area of the cuboid block structure, the area for arrangement of the through holes 113 is increased, and the liquid outflow area of the cleaning device 1 is thus increased.

Figure 3:
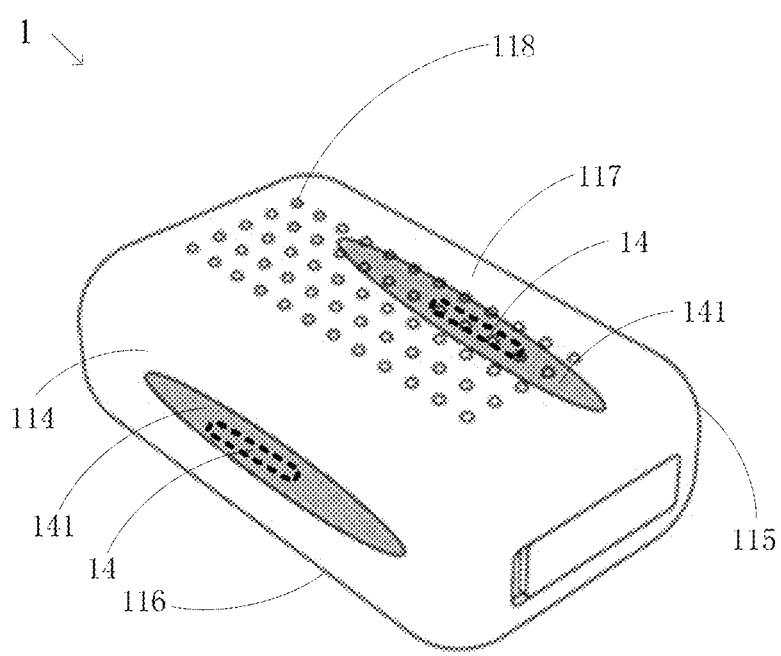
FIG. 3 is a stereoscopic structure diagram of the cleaning device according to some embodiments of the present disclosure.

Further, as shown in FIG. 3, decontaminating bumps 118 are further formed on the outer surface of the main body housing 11 to scrub an object to be cleaned. The cleaning effect of the cleaning main body is improved by the decontaminating bumps 118. The decontaminating bumps 118 and the through holes 113 are formed on different side faces of the main body housing 11, to avoid the mutual interference in structure between the decontaminating bumps and the through holes and also prevent debris from blocking the through holes 113 during scrubbing by the decontaminating bumps 118. For example, when the outer surface of the main body housing 11 includes a fourth side face opposite to the third side face 116, it is possible that the through holes 113 are arranged on the third side face 116 of the main body housing 11 and the decontaminating bumps 118 are arranged on the fourth side face 117.

It is to be noted that there may be multiple decontaminating bumps 118 which are arranged on a side face of the main body housing 11 in an array, to increase the area for arrangement of the decontaminating bumps 118 and improve the decontaminating effect.

The structures and arrangement modes of the cleaning liquid tank 12, the pressure sensor 14 and the flow controller 13, as well as the modes of fitting the cleaning liquid tank 12, the pressure sensor 14 and the flow controller 13 with the main body housing 11, will be described exemplarily below, respectively.

In some embodiments, as shown in FIG. 3, the cleaning device 1 includes one or more pressure sensors 14, which are arranged on the gripping portion 112 to sense a force applied by a user's hand when gripping the gripping portion 112. When the cleaning device 1 includes one pressure sensor 14, the pressure sensor 14 can be arranged at a position where the gripping portion 112 is matched with fingers, so that it is convenient to sense the force from the hand; or, the pressure sensor 14 can also be arranged in another region of the gripping portion 112. This will not be limited in the present disclosure. When the cleaning device 1 includes multiple sensors 14, the pressure sensors 14 are arranged in different regions of the gripping portion 112.

For example, the gripping portion 112 includes a first gripping region and a second gripping region; the outer surface of the main body housing 11 includes a first side face 114 and a second side face 115 opposite to each other; and, one of the first gripping region and the second gripping region is arranged on the first side face 114, while the other one thereof is arranged on the second side face 115. In this case, one or more pressure sensors 14 can be arranged in the first gripping region and the second gripping region, respectively, to sense the pressure in different regions of the gripping portion 112 and improve the accuracy of pressure sensing.

Further, an elastic cover 141 can be arranged outside the pressure sensor 14, so that the magnitude of the gripping force applied by the hand is monitored through the elastic deformation of the elastic cover 141. Since the pressure sensor 14 is arranged on the gripping portion 112 of the main body housing 11, the elastic cover 141 can improve the gripping feeling when gripping the gripping portion 112.

Figure 4:
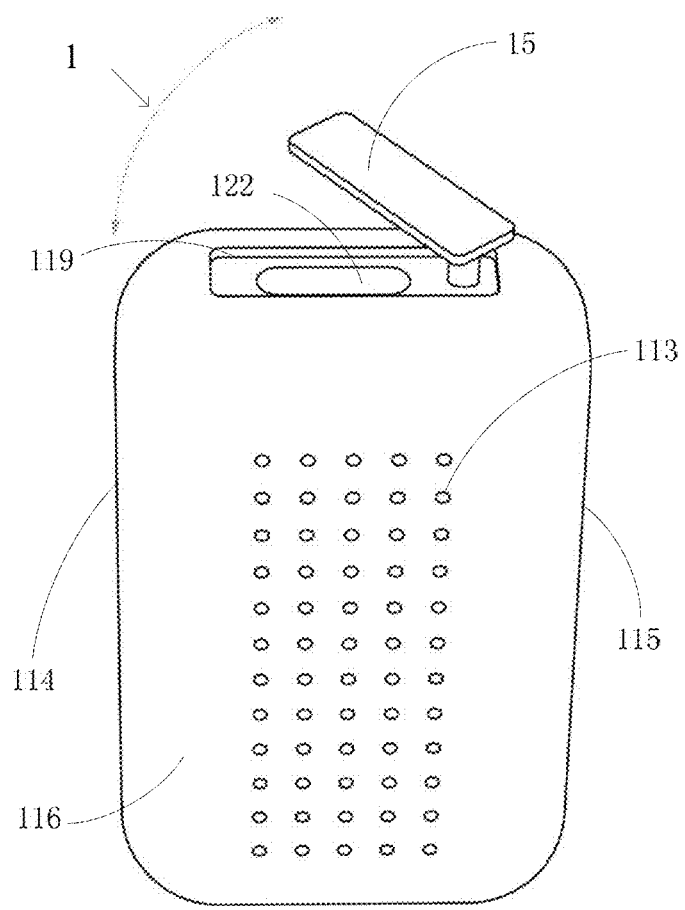
FIG. 4 is a stereoscopic structure diagram of the cleaning device according to another exemplary embodiment of the present disclosure.

In another embodiment, as shown in FIG. 4, a liquid feeding opening 122 is arranged on the cleaning liquid tank 12, a matched opening 119 and a waterproof plug 15 are correspondingly arranged on the main body housing 11, and the waterproof plug 15 is in detachable seal fit with the liquid feeding opening 122 and the matched opening 119. When it is necessary to supply the cleaning liquid, the waterproof plug 15 can be drawn out from the liquid feeding opening 122 and the matched opening 119, and the cleaning liquid is supplied to the cleaning liquid tank 12 through the liquid feeding opening 122. When in use of the cleaning device 1, the waterproof plug 15 is in seal fit with the liquid feeding opening 122 and the matched opening 119.

It is to be noted that, the waterproof plug 15 can be movably connected to the main body housing 11, so that it is convenient to disassemble or assemble the waterproof plug 15 and the loss of the waterproof plug 15 is avoided. The waterproof plug 15 can be made from elastic materials such as rubber, silica gel and plastics, so that the waterproof effect of the waterproof plug 15 when it is in seal fit with the liquid feeding opening 122 and the matched opening 119 is improved.

Figure 5:
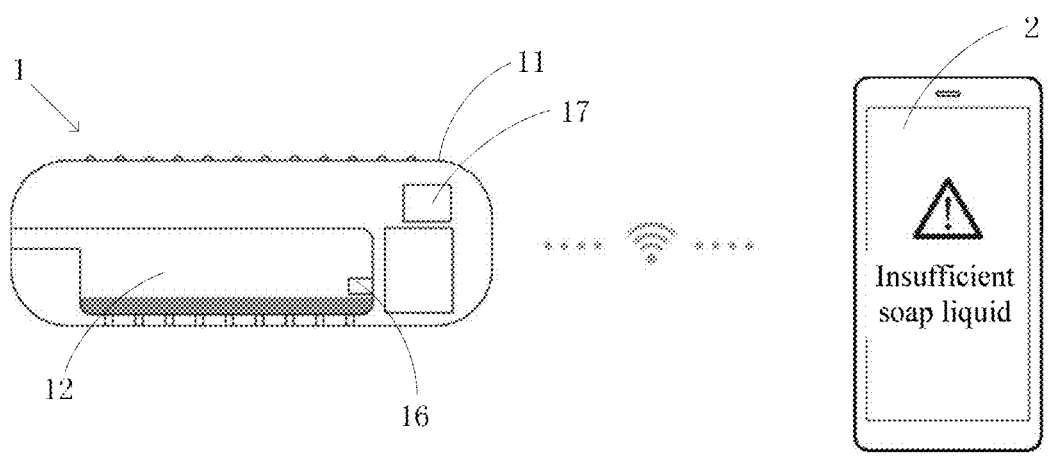
FIG. 5 is a schematic view of an application scenario of the cleaning device according to another exemplary embodiment of the present disclosure.

Further, as shown in FIG. 5, the cleaning device 1 can further include a wireless communication component 17. A liquid metering sensor 16 is arranged in the cleaning liquid tank 12, and the wireless communication component 17 is electrically connected to the liquid metering sensor 16 and an external device 2, respectively. The liquid metering sensor 16 is arranged at a preset position on the cleaning liquid tank 12 in its depth direction, to monitor the amount of the cleaning liquid in the cleaning liquid tank 12. When the amount of the cleaning liquid is below the liquid metering sensor 16, an alert "insufficient cleaning liquid" can be sent to the external device 2 through the wireless communication component 17, to remind the user of supplying the cleaning liquid to the cleaning device 1.

It is to be noted that the external device 2 may be a mobile phone, a tablet computer, a vehicle-mounted terminal, a medical terminal or the like. This will not be limited in the present disclosure.

Figure 6:
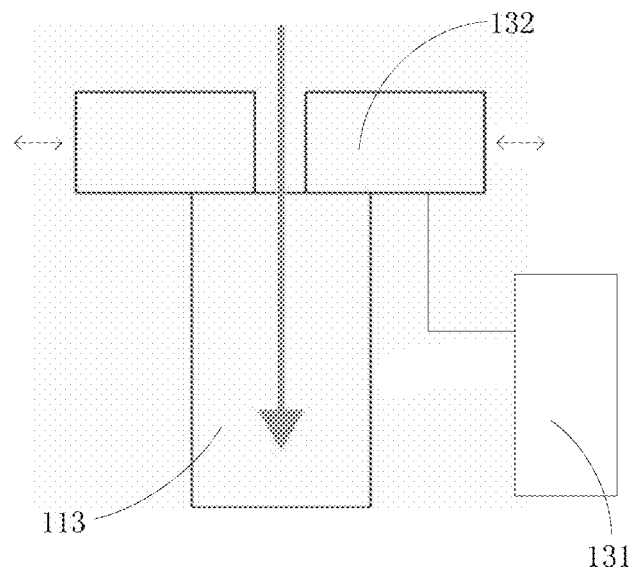
FIG. 6 is a schematic structure diagram of fitting a flow controller with a liquid outlet according to some embodiments of the present disclosure.

In still another embodiment, as shown in FIG. 6, the flow controller 13 includes a control component 131 and a flow limiter 132. The flow limiter 132 is movably fitted with the liquid outlet 121. The control component 131 is electrically connected to the pressure sensor 14 to drive the flow limiter 132 and change the flow limiting area of the flow limiter 132 fitted with the liquid outlet 121, according to a pressure signal transmitted by the pressure sensor 14. As shown in FIG. 6, the dashed arrow indicates the movement direction of the flow limiter 132, and the solid arrow indicates the flow direction of the cleaning liquid. The flow limiter 132 is a blocking structure arranged on the liquid outlet 121. The blocking structure can be electromagnetically or mechanically driven to move to or away from the center of the liquid outlet 121 by the control component 131. When the blocking structure is located at an initial position, the blocking structure completely blocks the liquid outlet 121, so that no cleaning liquid flows out.

Figure 7:
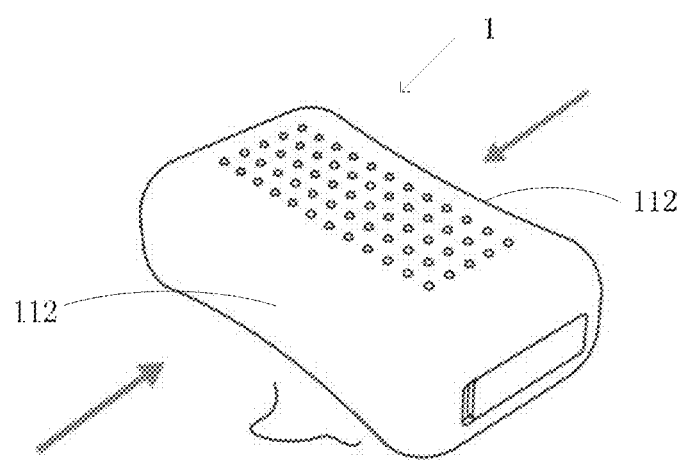
FIG. 7 is a schematic view of a service state of the cleaning device when subjected to a first pressure according to some embodiments of the present disclosure.
Figure 8:
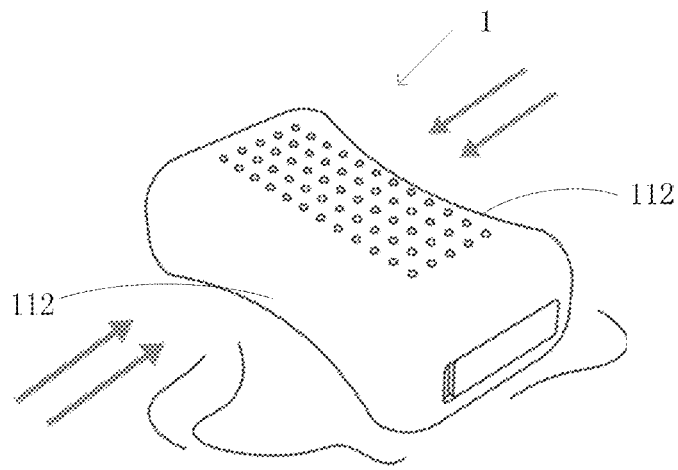
FIG. 8 is a schematic view of a service state of the cleaning device when subjected to a second pressure according to some embodiments of the present disclosure.

For example, when the pressure value sensed by the pressure sensor is less than a first threshold, the blocking structure is located at the initial position to maintain a state of blocking the liquid outlet 121. As shown in FIG. 7, when a first pressure acts on the cleaning device 1, the elastic cover 141 arranged outside the pressure sensor 14 correspondingly generates a first deformation. The pressure value sensed by the pressure sensor 14 is greater than the first threshold and less than a second threshold, and the flow limiting area of the blocking structure fitted with the liquid outlet 121 is decreased to half of that in the initial state, so as to provide a small liquid outflow. For example, as shown in FIG. 8, when a second pressure greater than the first pressure acts on the cleaning device 1, the elastic cover 141 arranged outside the pressure sensor 14 correspondingly generates a second deformation greater than the first deformation. The pressure value sensed by the pressure sensor 14 is greater than the second threshold, and the flow limiting area of the blocking structure fitted with the liquid outlet 121 is decreased to zero, that is, the liquid outlet 121 is not blocked completely, so that a large liquid outflow is provided.

Figure 9:
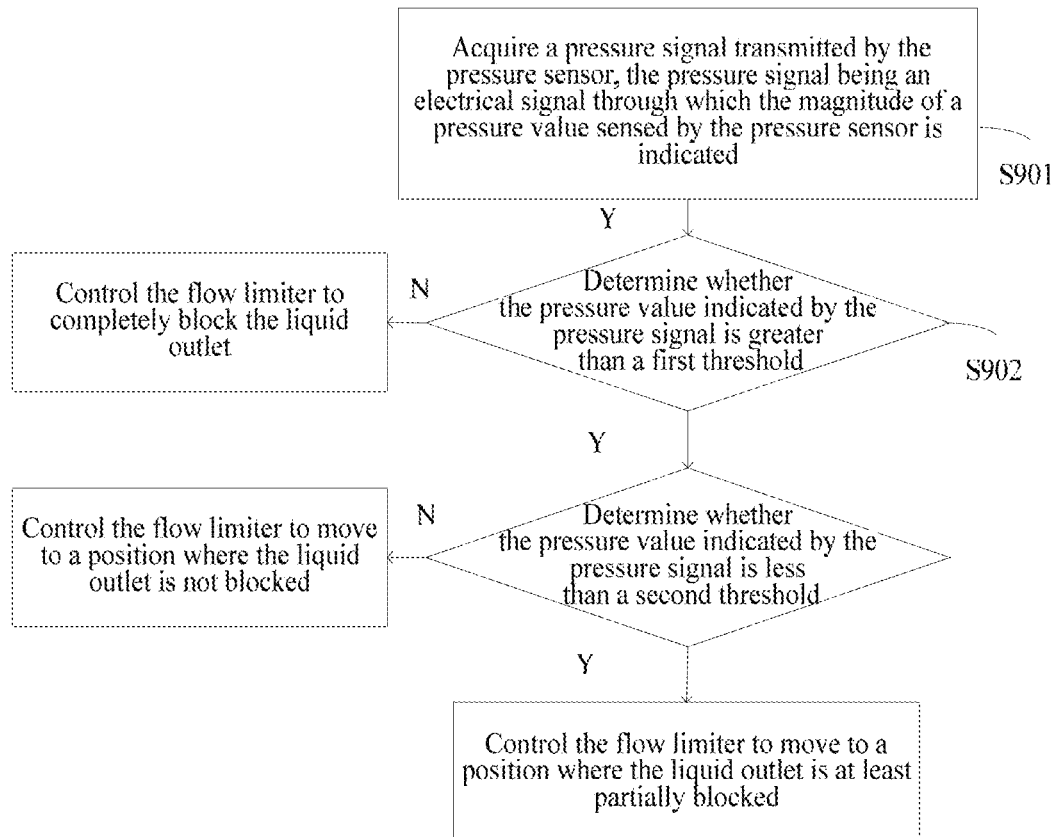
FIG. 9 is a flowchart of a method for controlling a cleaning device according to some embodiments of the present disclosure.

A method for controlling a cleaning device is applied to the cleaning device 1 described above. As shown in FIG. 9, the method for controlling a cleaning device can be implemented by the following steps.

In a step S901, a pressure signal transmitted by the pressure sensor 14 is acquired, the pressure signal being an electrical signal through which the magnitude of the pressure value sensed by the pressure sensor 14 is indicated.

In a step S902, it is determined whether the pressure value indicated by the pressure signal is greater than a first threshold; the flow limiter 132 is controlled to completely block the liquid outlet 121 if the pressure value indicated by the pressure signal is not greater than the first threshold; it is determined whether the pressure value indicated by the pressure signal is less than a second threshold if the pressure value indicated by the pressure signal is greater than the first threshold; the flow limiter 132 is controlled to move to a position where the liquid outlet 121 is partially blocked when the pressure value indicated by the pressure signal is less than the second threshold; and, the flow limiter 132 is controlled to move to a position where the liquid outlet 121 is not blocked and which is distal from the liquid outlet 121 when the pressure value indicated by the pressure signal is greater than the second threshold.

It is to be noted that, when the pressure value indicated by the pressure signal is less than the second threshold and greater than the first threshold, the flow limiter 132 is controlled to move to a position where the liquid outlet 121 is partially blocked. The flow limiter 132 can be controlled to move to a position where one third, half, two thirds, etc. of the liquid outlet 121 is blocked, and this position can be set according to the specific liquid outflow requirement. This will not be limited in the present disclosure.

Further, the cleaning device 1 can include a wireless communication component 17 and a liquid metering sensor 16 arranged in the cleaning liquid tank 12. The wireless communication component 17 is electrically connected to the liquid metering sensor 16 and an external device 2, respectively. The method for controlling a cleaning device can further include the following steps.

First, a monitored value of the amount of cleaning liquid in the cleaning liquid tank 12 is acquired from the liquid metering sensor 16.

Second, it is determined whether the monitored value is less than a preset numerical value, and alert information is sent to the external device 2 through the wireless communication component 17 if the monitored value is less than the preset numerical value.

In this method, the residual amount of the cleaning liquid in the cleaning device 1 can be intelligently monitored by the external device 2 for example a mobile phone or a tablet computer; and, when the residual amount of the cleaning liquid is insufficient, an alert message is received, and the cleaning liquid is supplied according to the alert message, avoiding inconvenience caused by manually checking the residual amount of the cleaning liquid in the cleaning device.

Figure 10:
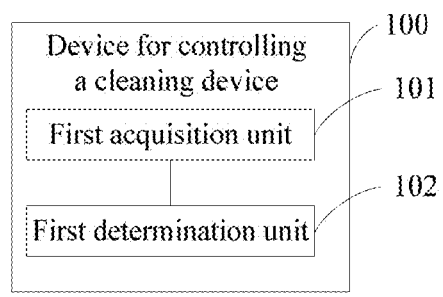
FIG. 10 is a structural block diagram of a device for controlling a cleaning device according to some embodiments of the present disclosure.

In accordance with the above embodiment, the present disclosure further provides a device for controlling a cleaning device, which is applied to the cleaning device described above. As shown in FIG. 10, further, the device 100 for controlling a cleaning device may include a first acquisition component 101 and a first determination component 102, wherein:

The first acquisition component 101 is configured to acquire a pressure signal transmitted by the pressure sensor 14, the pressure signal being an electrical signal through which the magnitude of the pressure value sensed by the pressure sensor 14 is indicated.

The first determination component 102 is configured to determine whether the pressure value indicated by the pressure signal is greater than a first threshold; control the flow limiter 132 to completely block the liquid outlet 121 if the pressure value indicated by the pressure signal is not greater than the first threshold; determine whether the pressure value indicated by the pressure signal is less than a second threshold if the pressure value indicated by the pressure signal is greater than the first threshold; control the flow limiter 132 to move to a position where the liquid outlet 121 is partially blocked when the pressure value indicated by the pressure signal is less than the second threshold; and control the flow limiter 132 to move to a position where the liquid outlet 121 is not blocked and which is distal from the liquid outlet 121 when the pressure value indicated by the pressure signal is greater than the second threshold.

It is to be noted that, when the pressure value indicated by the pressure signal is less than the second threshold and greater than the first threshold, the flow limiter 132 is controlled to move to a position where the liquid outlet 121 is partially blocked. The flow limiter 132 can be controlled to move to a position where one third, half, two thirds, etc. of the liquid outlet 121 is blocked, and this position can be set according to the specific liquid outflow requirement. This will not be limited in the present disclosure.

Further, the cleaning device 1 includes a wireless communication component 17 and a liquid metering sensor 16 arranged in the cleaning liquid tank 12. The wireless communication component 17 is electrically connected to the liquid metering sensor 16 and an external device 2, respectively. The device 100 for controlling a cleaning device further includes a second acquisition component and a second determination component, wherein:

The second acquisition component is configured to acquire, from the liquid metering sensor 16, a monitored value of the amount of cleaning liquid in the cleaning liquid tank 12.

The second determination component is configured to determine whether the monitored value is less than a preset numerical value, and send alert information to the external device 2 through the wireless communication component 17 if the monitored value is less than the preset numerical value.

For the devices in the foregoing embodiments, the specific operations executed by each unit have been described in detail in the embodiments of the methods, and will not be repeated here.

Since the device embodiments basically correspond to the method embodiments, the related description of the device embodiments may refer to the partial description of the method embodiments. The device embodiments described above are merely exemplary, wherein the units described as separate components may be or may not be physically separated, and the components displayed as units may be or may not be physical units. That is, the units may be located at a same position, or may be distributed on multiple network units. Some or all of the modules may be selected to achieve the purpose of the solutions of the present disclosure according to actual needs. The present disclosure can be understood and implemented by a person of ordinary skill in the art without paying any creative effort.

Correspondingly, the present disclosure further provides a device for controlling a cleaning device, including: a processor, and memory configured to store instructions executable by the processor, wherein the processor is configured to:

acquire a pressure signal transmitted by the pressure sensor 14, the pressure signal being an electrical signal through which the magnitude of the pressure value sensed by the pressure sensor 14 is indicated; and determine whether the pressure value indicated by the pressure signal is greater than a first threshold; control the flow limiter 132 to completely block the liquid outlet 121 if the pressure value indicated by the pressure signal is not greater than the first threshold; determine whether the pressure value indicated by the pressure signal is less than a second threshold if the pressure value indicated by the pressure signal is greater than the first threshold; control the flow limiter 132 to move to a position where the liquid outlet 121 is partially blocked when the pressure value indicated by the pressure signal is less than the second threshold; and control the flow limiter 132 to move to a position where the liquid outlet 121 is not blocked and which is distal from the liquid outlet 121 when the pressure value indicated by the pressure signal is greater than the second threshold.

It is to be noted that, when the pressure value indicated by the pressure signal is less than the second threshold and greater than the first threshold, the flow limiter 132 is controlled to move a position where the liquid outlet 121 is partially blocked. The flow limiter 132 can be controlled to move to a position where one third, half, two thirds, etc. of the liquid outlet 121 is blocked, and this position can be set according to the specific liquid outflow requirement. This will not be limited in the present disclosure.

Accordingly, various embodiments of the present disclosure further provide a terminal, including memory and one or more programs, wherein the one or more programs are stored in the memory and configured to be executed by one or more processors to execute instructions that, contained in the one or more programs, performing the following operations: acquiring a pressure signal transmitted by the pressure sensor 14, the pressure signal being an electrical signal through which the magnitude of a pressure value sensed by the pressure sensor 14 is indicated; and, determining whether the pressure value indicated by the pressure signal is greater than a first threshold; controlling the flow limiter 132 to completely block the liquid outlet 121 if the pressure value indicated by the pressure signal is not greater than the first threshold; determining whether the pressure value indicated by the pressure signal is less than a second threshold if the pressure value indicated by the pressure signal is greater than the first threshold; controlling the flow limiter 132 to move to a position where the liquid outlet 121 is partially blocked when the pressure value indicated by the pressure signal is less than the second threshold; and controlling the flow limiter 132 to move to a position where the liquid outlet 121 is not blocked and which is distal from the liquid outlet 121 when the pressure value indicated by the pressure signal is greater than the second threshold.

It is to be noted that, when the pressure value indicated by the pressure signal is less than the second threshold and greater than the first threshold, the flow limiter 132 is controlled to move a position where the liquid outlet 121 is partially blocked. The flow limiter 132 can be controlled to move to a position where one third, half, two thirds, etc. of the liquid outlet 121 is blocked, and this position can be set according to the specific liquid outflow requirement. This will not be limited in the present disclosure.

Figure 11:
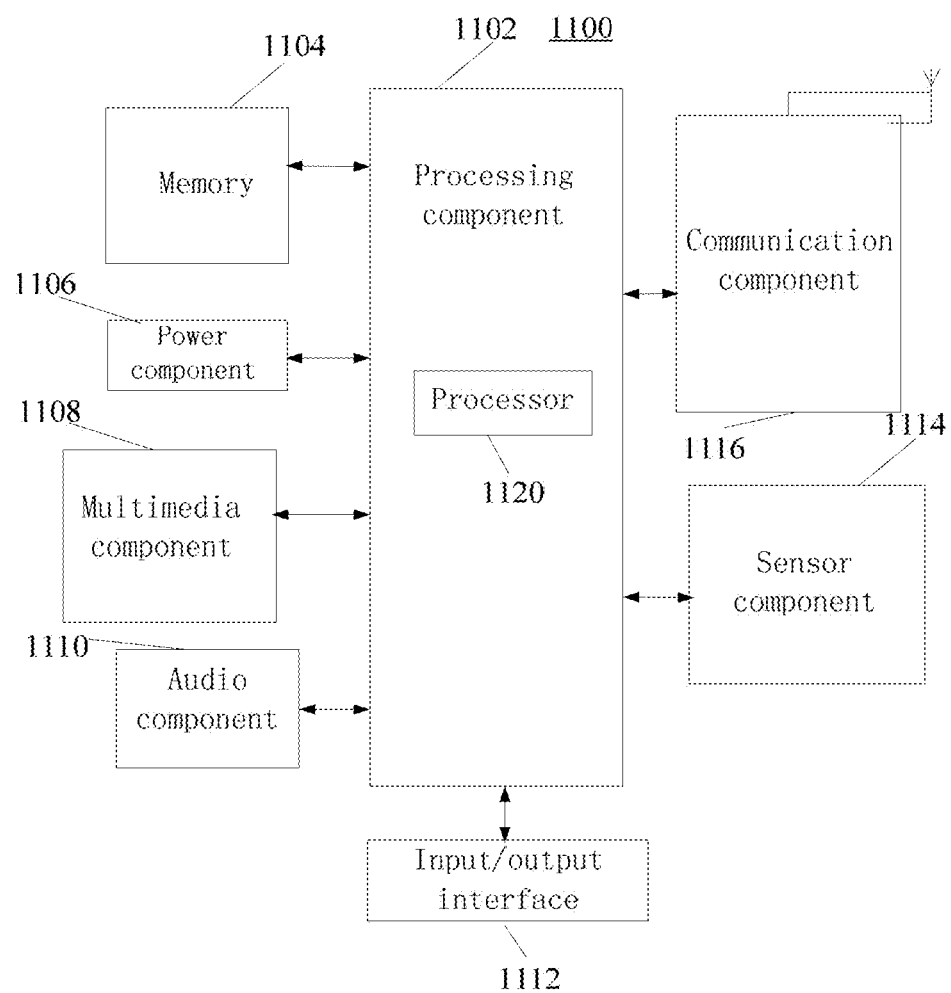
FIG. 11 is a block diagram of a device for controlling a cleaning device according to some embodiments.

FIG. 11 is a block diagram of a device for controlling a cleaning device according to some embodiments. For example, the device 1100 may be a mobile phone, a computer, a digital broadcasting terminal, a messaging device, a game console, a tablet device, a medical device, a fitness device, a personal digital assistant or the like.

With reference to FIG. 11, the device 1100 may include one or more of the following components: a processing component 1102, memory 1104, a power component 1106, a multimedia component 1108, an audio component 1110, an input/output (I/O) interface 1112, a sensor component 1114 and a communication component 1116.

The processing component 1102 generally controls the overall operation of the device 1100, such as operations associated with display, telephone call, data communication, camera operations and recording operations. The processing component 1102 may include one or more processors 1120 to execute instructions to complete all or some of the steps in the methods described above. Additionally, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 is configured to store various types of data to support the operation of the device 1100. Examples of the data include instructions for any application or method operating on the device 1100, contact data, phonebook data, messages, pictures, video or the like. The memory 1104 may be implemented by any type of volatile or non-volatile storage devices or a combination thereof, for example, static random access memories (SRAMs), electrically erasable programmable read-only memories (EEPROMs), erasable programmable read-only memories (EPROMs), programmable read-only memories (PROMs), read-only memories (ROMs), magnetic memories, flash memories, magnetic disks or optical disks.

The power component 1106 supplies power to various components of the device 1100. The power component 1106 may include a power management system, one or more power supplies, and other components associated with the generation, management and distribution of power for the device 1100.

The multimedia component 1108 includes a screen to provide an output interface between the device 1100 and a user. In some embodiments, the screen may include a liquid crystal display (LCD) and a touch panel (TP). In some embodiments, organic light-emitting diode (OLED) or other types of displays can be employed.

If the screen includes a TP, the screen may be implemented as a touch screen to receive input signals from the user. The touch panel includes one or more touch sensors to sense touch, slide and gestures on the touch panel. The touch sensor may sense the boundary of a touch or slide action, and also detect the duration and pressure related to the touch or slide operation. In some embodiments, the multimedia component 1108 includes a front camera and/or a rear camera. When the device 1100 is in an operation mode, for example, a shooting mode or a video mode, the front camera and/or the rear camera may receive external multimedia data. Each of the front camera and the rear camera may be a fixed optical lens system or have a focal length and an optical zooming capability.

The audio component 1110 is configured to output and/or input audio signals. For example, the audio component 1110 includes a microphone (MIC). When the device 1100 is in an operation mode, for example, a calling mode, a recording mode or a voice recognition mode, the microphone is configured to receive external audio signals. The received audio signals may be further stored in the memory 1104 or transmitted through the communication component 1116. In some embodiments, the audio component 1110 further includes a loudspeaker configured to output the audio signals.

The I/O interface 1112 provides an interface between the processing component 1102 and a peripheral interface module. The peripheral interface module may be a keyboard, a click wheel, buttons or the like. These buttons may include, but not limited to, a Home button, a Volume button, a Start button and a Lock button.

The sensor component 1114 includes one or more sensors configured to provide state evaluation of various aspects of the device 1100. For example, the sensor component 1114 may detect the on/off state of the device 1100 and the relative position of a component. For example, the component is a display and a keypad of the device 1100, the sensor component 1114 may also detect the position change of the device 1100 or one component of the device 1100, the presence or absence of the user's contact with the device 1100, the orientation or acceleration/deceleration of the device 1100 and the temperature change of the device 1100. The sensor component 1114 may include a proximity sensor configured to detect the presence of nearby objects without any physical contact. The sensor component 1114 may further include an optical sensor (e.g., a CMOS or CCD image sensor) for use in imaging applications. In some embodiments, the sensor component 1114 may further include an acceleration sensor, a gyroscope sensor, a magnetic sensor, a pressure sensor or a temperature sensor.

The communication component 1116 is configured to facilitate the wired or wireless communication between the device 1100 and other devices. The device 1100 may access to a wireless network based on communication standards, for example, Wi-Fi, 2G, 3G, 4G long-term evolution (LTE), 5G new radio (NR), or a combination thereof. In some embodiments, the communication component 1116 receives a broadcast signal or broadcast related information from an external broadcast management system via a broadcast channel. In some embodiments, the communication component 1116 further includes a near-field communication (NFC) module to facilitate short-range communication. For example, the NFC module may be implemented based on radio frequency identification (RFID) technologies, infrared data association (IrDA) technologies, ultra-wide band (UWB) technologies, Bluetooth (BT) technologies and other technologies.

In some embodiments, the device 1100 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements to execute the methods described above.

Various embodiments of the present disclosure further provide a non-transitory computer-readable storage medium storing computer instructions that, when executed by a processor, implement the steps in the method for controlling a cleaning device described above. In some embodiments, a non-temporary computer readable storage medium comprising instructions is further provided, for example, the memory 1104 comprising instructions. The instructions may be executed by the processor 1120 of the device 1100 to complete the method for controlling a cleaning device described above. For example, the non-temporary computer readable storage medium may be ROMs, random access memories (RAMs), CD-ROMs, magnetic tapes, floppy disks, optical data storage devices or the like.

Figure 12:
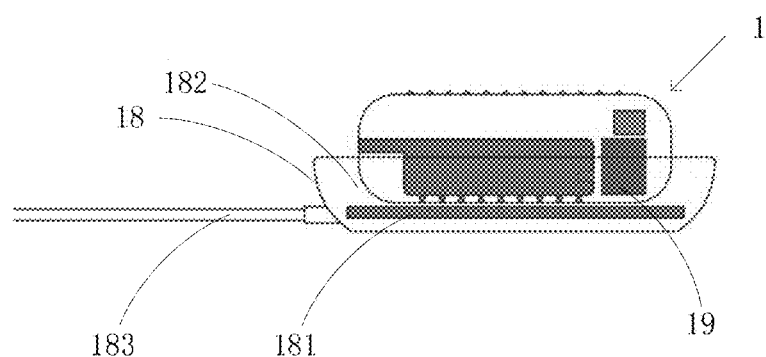
FIG. 12 is a schematic sectional view of the cleaning device according to another exemplary embodiment of the present disclosure.

Additionally, as shown FIG. 12, the cleaning device 1 further includes a charging base 18 in which a wireless charging component 181 is arranged. A power supply 19 is arranged in the main body housing 11. The power supply 19 is electrically connected to the pressure sensor 14, the flow controller 13 and the wireless communication component 17, to supply power to the pressure sensor 14, the flow controller 13, the liquid metering sensor 16 and the wireless communication component 17. When the main body housing 11 is fitted with the charging base 18, the wireless charging component 181 corresponds to the power supply 19 in position, so that the power supply 19 is charged by fitting the wireless charging component with the power supply 19.

Figure 13:
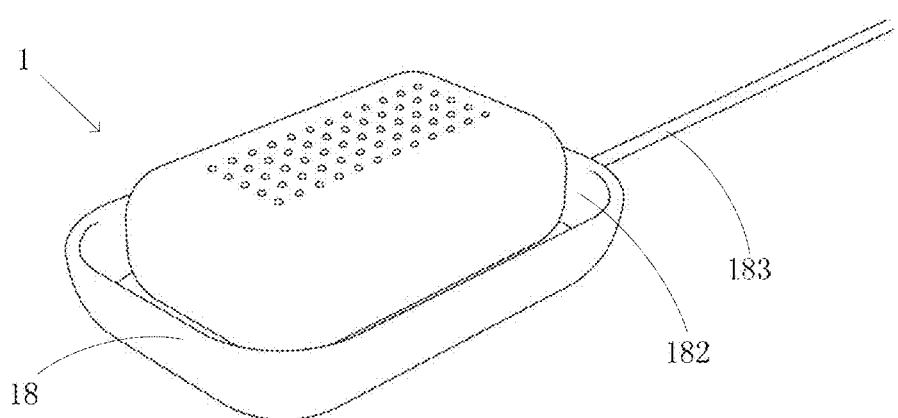
FIG. 13 is a stereoscopic structure diagram of the cleaning device according to still another exemplary embodiment of the present disclosure.

Further, as shown in FIG. 13, the charging base 18 includes an accommodating groove 182 which is matched with the main body housing 11 in size. The wireless charging component 181 is arranged on the bottom of the accommodating groove 182. When the cleaning device 1 is fitted with the charging base 18, the cleaning device 1 can be accommodated within the accommodating groove 182. On one hand, it is convenient to fit the wireless charging component 181 with the power supply 19 for charging; and on the other hand, an accommodating space is provided for the cleaning device 1, so that the cleaning device is prevented from falling down and the cleanness of the cleaning device 1 is improved.

Further, the charging base 18 further includes a power line 183. The power line 183 is electrically connected to the wireless charging component 181 to supply power for the operation of the wireless charging component 181. The power line 183 extends out from the sidewall of the accommodating groove 182, to avoid affecting the fitting of the charging base 18 with the cleaning device 1.

By arranging the pressure sensors 14 on the gripping portion 112 of the main body housing 11 and movably fitting the flow limiter 132 of the flow controller 13 with the liquid outlet 121 of the cleaning liquid tank 12, the control component 131 of the flow controller 13 drives the flow limiter 132 according to pressure signals transmitted by the pressure sensors 14, so that the flow limiting area of the flow limiter 132 fitted with the liquid outlet 121 is changed. With the above structural arrangement, when gripping the cleaning device 1, a user can control the liquid outflow of the cleaning liquid by the pressure applied to the pressure sensor by hands during gripping, so that the liquid outflow meets the use requirement at one time. Accordingly, repeated squeezing and pouring are avoided, and the convenience and intelligence for the user in using the cleaning liquid are enhanced.

Various embodiments of the present disclosure can have one or more of the following advantages.

By arranging the pressure sensor on a gripping portion of the main body housing and movably fitting the flow limiter of the flow controller with the liquid outlet of the cleaning liquid tank, the control component of the flow controller drives the flow limiter according to a pressure signal transmitted by the pressure sensor, so that the flow limiting area of the flow limiter fitted with the liquid outlet is changed. With the above structural arrangement, when gripping the cleaning device, a user can control the outflow of cleaning liquid by the pressure applied to the pressure sensor by hands during gripping, so that the liquid outflow meets the use requirement for each single squeeze. Accordingly, repeated squeezing and pouring are avoided, and the convenience and intelligence for the user in using the cleaning liquid are enhanced.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A cleaning device, comprising:
    a main body housing, an inner surface of the main body housing forming an accommodating space, a gripping portion being arranged on an outer surface of the main body housing, and one or more through holes communicatively coupling the accommodating space with outside being arranged on the main body housing;
    a cleaning liquid tank, accommodated within the accommodating space, one or more liquid outlets being formed on the cleaning liquid tank and fitted with the one or more through holes;
    one or more pressure sensors, arranged on the gripping portion; and
    a flow controller, comprising a control component and flow limiters, the flow limiters being movably fitted with the one or more liquid outlets, the control component being electrically connected to the one or more pressure sensors to drive the flow limiters and change a flow limiting area of the flow limiters fitted with the one or more liquid outlets, according to a pressure signal transmitted by the one or more pressure sensors.

2. The cleaning device according to claim 1, wherein one or more elastic covers are arranged outside the one or more pressure sensors.

3. The cleaning device according to claim 1, wherein the cleaning device comprises multiple pressure sensors arranged in different regions of the gripping portion.

4. The cleaning device according to claim 3, wherein the gripping portion comprises a first gripping region and a second gripping region; the outer surface of the main body housing comprises a first side face and a second side face opposite to the first side face; and one of the first gripping region and the second gripping region is arranged on the first side face, and the other gripping region is arranged on the second side face.

5. The cleaning device according to claim 1, wherein a liquid feeding opening is formed on the cleaning liquid tank; a matched opening and a waterproof plug are correspondingly arranged on the main body housing; and, the waterproof plug is in detachable seal fit with the liquid feeding opening and the matched opening.

6. The cleaning device according to claim 1, wherein multiple through holes are arranged on the main body housing, and the multiple through holes are uniformly distributed on any sidewall of the main body housing.

7. The cleaning device according to claim 1, wherein decontaminating bumps are further arranged on the outer surface of the main body housing, and the decontaminating bumps and the one or more through holes are arranged on different side faces of the main body housing.

8. The cleaning device according to claim 1, further comprising a wireless communication component, a liquid metering sensor being arranged in the cleaning liquid tank, the wireless communication component being electrically connected to the liquid metering sensor and an external device, respectively.

9. The cleaning device according to claim 1, further comprising a charging base in which a wireless charging component is arranged, a power supply being arranged in the main body housing; and, when the main body housing is fitted with the charging base, a position of the wireless charging component corresponds to a position of the power supply.

10. The cleaning device according to claim 9, wherein the charging base comprises an accommodating groove which is matched with the main body housing in size; and the wireless charging component is arranged on a bottom of the accommodating groove.

11. A method for controlling a cleaning device, applied to the cleaning device according to claim 1, comprising:
acquiring a pressure signal transmitted by the one or more pressure sensors, the pressure signal being an electrical signal through which the magnitude of a pressure value sensed by the pressure sensor is indicated; and
determining whether the pressure value indicated by the pressure signal is greater than a first threshold; controlling the flow limiter to completely block the liquid outlet if the pressure value indicated by the pressure signal is not greater than the first threshold; determining whether the pressure value indicated by the pressure signal is less than a second threshold if the pressure value indicated by the pressure signal is greater than the first threshold; controlling the flow limiter to move to a position where the liquid outlet is at least partially blocked when the pressure value indicated by the pressure signal is less than the second threshold; and, controlling the flow limiter to move to a position where the liquid outlet is not blocked and which is distal from the liquid outlet when the pressure value indicated by the pressure signal is greater than the second threshold.

12. The method for controlling a cleaning device according to claim 11, wherein the cleaning device comprises a wireless communication component and a liquid metering sensor arranged in the cleaning liquid tank, the wireless communication component being electrically connected to the liquid metering sensor and an external device, respectively; and, the method further comprises:
acquiring, from the liquid metering sensor, a monitored value of the amount of cleaning liquid in the cleaning liquid tank; and
determining whether the monitored value is less than a preset numerical value, and sending alert information to the external device through the wireless communication component if the monitored value is less than the preset numerical value.

13. A device for controlling a cleaning device, applied to the cleaning device according to claim 1, comprising:
a processor; and
memory configured to store instructions executable for the processor that, when executed by the processor, causes the processor to:
acquire a pressure signal transmitted by the one or more pressure sensors, the pressure signal being an electrical signal through which the magnitude of a pressure value sensed by the one or more pressure sensors is indicated; and
determine whether the pressure value indicated by the pressure signal is greater than a first threshold; control the flow limiters to completely block the one or more liquid outlets if the pressure value indicated by the pressure signal is not greater than the first threshold; determine whether the pressure value indicated by the pressure signal is less than a second threshold if the pressure value indicated by the pressure signal is greater than the first threshold; control the flow limiters to move to a position where the one or more liquid outlets is at least partially blocked when the pressure value indicated by the pressure signal is less than the second threshold; and, control the flow limiters to move to a position where the one or more liquid outlets is not blocked and which is distal from the one or more liquid outlets when the pressure value indicated by the pressure signal is greater than the second threshold.

14. The device for controlling a cleaning device according to claim 13, wherein the cleaning device comprises a wireless communication component and a liquid metering sensor arranged in the cleaning liquid tank, the wireless communication component being electrically connected to the liquid metering sensor and an external device, respectively; and, the instructions further cause the processor to:
acquire, from the liquid metering sensor, a monitored value of an amount of cleaning liquid in the cleaning liquid tank; and
determine whether the monitored value is less than a preset numerical value, and send alert information to the external device through the wireless communication component if the monitored value is less than the preset numerical value.

15. A non-transitory computer-readable storage medium storing computer instructions for execution by a processing circuit to implement operations of the method according to claim 11.

16. A cleaning apparatus comprising the cleaning device of claim 1, wherein the control component of the flow controller is configured to drive the flow limiters according to the pressure signal transmitted by the one or more pressure sensors, such that the flow limiting area of the flow limiters fitted with the liquid outlet is changed to facilitate a user controlling the outflow of cleaning liquid by the pressure applied to the one or more pressure sensors to meet a use requirement with a single squeeze.

17. The cleaning apparatus of claim 16, further comprising a processing circuit configured to:
acquire a pressure signal transmitted by the one or more pressure sensors, the pressure signal being an electrical signal through which a magnitude of a pressure value sensed by the one or more pressure sensors is indicated; and determine whether the pressure value indicated by the pressure signal is greater than a first threshold; control the flow limiters to completely block the one or more liquid outlets if the pressure value indicated by the pressure signal is not greater than the first threshold; determine whether the pressure value indicated by the pressure signal is less than a second threshold if the pressure value indicated by the pressure signal is greater than the first threshold; control the flow limiters to move to a position where the one or more liquid outlets is at least partially blocked when the pressure value indicated by the pressure signal is less than the second threshold; and, control the flow limiters to move to a position where the liquid outlet is not blocked and which is distal from the one or more liquid outlets when the pressure value indicated by the pressure signal is greater than the second threshold.

18. The cleaning apparatus of claim 17, further comprising a wireless communication component and a liquid metering sensor arranged in the cleaning liquid tank, the wireless communication component being electrically connected to the liquid metering sensor and an external device, respectively; wherein the processing circuit is further configured to:

acquire, from the liquid metering sensor, a monitored value of an amount of cleaning liquid in the cleaning liquid tank; and determine whether the monitored value is less than a preset numerical value, and send alert information to the external device through the wireless communication component if the monitored value is less than the preset numerical value.

* * * * *